United States Patent
Coffey et al.

(10) Patent No.: US 6,614,668 B2
(45) Date of Patent: Sep. 2, 2003

(54) METHOD AND SYSTEM FOR LIMITING IN RUSH CURRENT OF A POWER SUPPLY FILTER

(75) Inventors: Joseph Coffey, Burnsville, MN (US); Delfino Hernandez, Juarez (MX)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/043,652

(22) Filed: Jan. 10, 2002

(65) Prior Publication Data

US 2003/0128557 A1 Jul. 10, 2003

(51) Int. Cl.[7] .............................. H02M 1/12; H02M 1/14
(52) U.S. Cl. ........................ 363/39; 363/40; 323/901; 323/908; 323/222
(58) Field of Search .................... 363/39, 40; 323/222, 323/901, 908

(56) References Cited

U.S. PATENT DOCUMENTS

| | | | |
|---|---|---|---|
| 4,031,559 A | 6/1977 | Peters | |
| 4,408,171 A | 10/1983 | Akino et al. | |
| 4,719,553 A | 1/1988 | Hinckley | |
| 4,916,329 A | 4/1990 | Dang et al. | |
| 4,982,306 A | * 1/1991 | Koroncai et al. | ............. 361/58 |
| 5,061,913 A | 10/1991 | Okochi et al. | |
| 5,134,307 A | 7/1992 | Nakano | |
| 5,552,976 A | 9/1996 | Munro et al. | |
| 5,640,312 A | 6/1997 | Carroll | |
| 5,654,661 A | 8/1997 | Kammiller | |
| 5,737,207 A | 4/1998 | Uratani et al. | |
| 5,751,532 A | 5/1998 | Kanuchok et al. | |
| 5,818,705 A | 10/1998 | Faulk | |
| 5,850,337 A | 12/1998 | Lee | |
| 5,914,849 A | 6/1999 | Perreira | |
| 6,009,008 A | 12/1999 | Pelly | |
| 6,038,155 A | 3/2000 | Pelly | |
| 6,088,243 A | 7/2000 | Shin | |
| 6,147,478 A | * 11/2000 | Skelton et al. | ............... 323/288 |
| 6,160,386 A | * 12/2000 | Hemena et al. | .............. 323/272 |
| 6,259,239 B1 | 7/2001 | Liu | |
| 6,348,833 B1 | * 2/2002 | Tsujimoto et al. | ........... 327/540 |
| 6,353,545 B1 | * 3/2002 | Ueda | ........................... 363/40 |
| 6,480,399 B2 | * 11/2002 | Balakrishnan et al. | ......... 363/16 |

\* cited by examiner

*Primary Examiner*—Bao Q. Vu
(74) *Attorney, Agent, or Firm*—Merchant & Gould

(57) ABSTRACT

A power supply is filtered while the amount of in-rush current required by the capacitive charging of the filter is limited. A resistor may be placed in parallel with a relay where the parallel combination is in series with the filtering capacitor. The relay is open upon applying power to the filter and remains open while the capacitor at least partially charges to cause charging current to pass through the resistor and thereby limit in-rush current. The relay is closed thereafter to provide a short circuit around the resistor and thereby unrestrict filtering by the capacitor. Alternatively, a common mode choke is disposed between a capacitor across input nodes and a capacitor across output nodes, whereby the size of the capacitors may be reduced to limit the in-rush current due to the common mode choke. The power supply filter may be included as part of a power distribution panel.

26 Claims, 3 Drawing Sheets

METHOD AND SYSTEM FOR LIMITING IN RUSH CURRENT OF A POWER SUPPLY FILTER

TECHNICAL FIELD

The present invention relates to filtering of power supplies. More particularly, the present invention relates to limiting the amount of in-rush current that occurs upon applying voltage to the power supply filter.

BACKGROUND

Power supplies are filtered to prevent noise from being transferred from the power supply to the load. Noise may emanate from various sources, including ripple from an alternating current (AC) power source that is rectified to provide direct current (DC) voltage from the power supply. Furthermore, loads that receive energy from the power supplies may emanate noise that returns to the power supply and is potentially distributed to additional loads being powered.

To prevent noise from being distributed by a power supply to its associated loads, a power supply filter is used to suppress the noise. The power supply filter generally contains capacitive and/or inductive components that obstruct frequencies that contribute to the noise. To provide a steady level of DC voltage, large capacitors may be connected in parallel with the power supply to suppress any voltage ripple or other noise. When the power supply is first energized, the large capacitor may contain little or no charge and as a result a large in-rush current may occur to instantaneously charge the capacitor.

For safety, power supplies employ over-current protection such as a fuse or circuit breaker. The large in-rush current that may occur may be much greater than the normal operating current being drawn by the load of the power supply. Therefore, the large in-rush current blows the fuse or trips the circuit breaker, and proper operation of the power supply is inhibited.

Attempts to prevent the in-rush current from aggravating the over-current protection have included operators manually connecting a resistor in series between the charge capacitor and power supply for a period of time and then removing the resistor to directly reconnect the capacitor across the power supply output. For relatively high-voltage power supplies, the charged capacitor presents a dangerous potential for electrical shock when the operator is manually handling leads from the capacitor.

Thus, power supply filters are a necessary feature of power supplies, but they result in additional problems and hazards due to the in-rush current problem.

SUMMARY

Embodiments of the present invention provide systems and methods that address the shortcomings of power supply filters resulting from the in-rush current problem. The embodiments provide various circuit elements for limiting the amount of in-rush current that exists upon energizing the power supply. The various circuit elements also allow the filtering to be unrestricted even though the in-rush current is limited to avoid tripping any over-current protection that may be provided for the power supply. The various embodiments include power supply filters positioned within power distribution panels.

One embodiment involves placing a resistor in series with the filtering capacitor. A relay is in parallel with the resistor and is left in an open circuit condition upon energizing the power supply so that current passes through the resistor when charging the capacitor. Once the filtering capacitor is at least partially charged, the relay is switched to a closed circuit condition to short circuit the resistor, and thereby directly connect the filtering capacitor across the voltage nodes of the power supply that the load may be connected across. The relay may be controlled in various ways. In one embodiment, the relay is controlled based on a comparison of the voltage across the filtering capacitor to the power supply voltage. In another embodiment, the relay is controlled based on expiration of a set amount of time.

Another embodiment involves placing a first filtering capacitor across first and second input nodes, a second filter capacitor across first and second output nodes, and a common mode choke between the input and output nodes. The common mode choke is disposed such that current flows between the first input node and first output node by passing in one direction through the common mode choke and current flows between the second output node and the second input node by passing through the common mode choke in a second direction opposite the first. The placement and operation of the common mode choke allows the first and second capacitors to have a relatively small capacitance.

DETAILED DESCRIPTION

Figure 1:
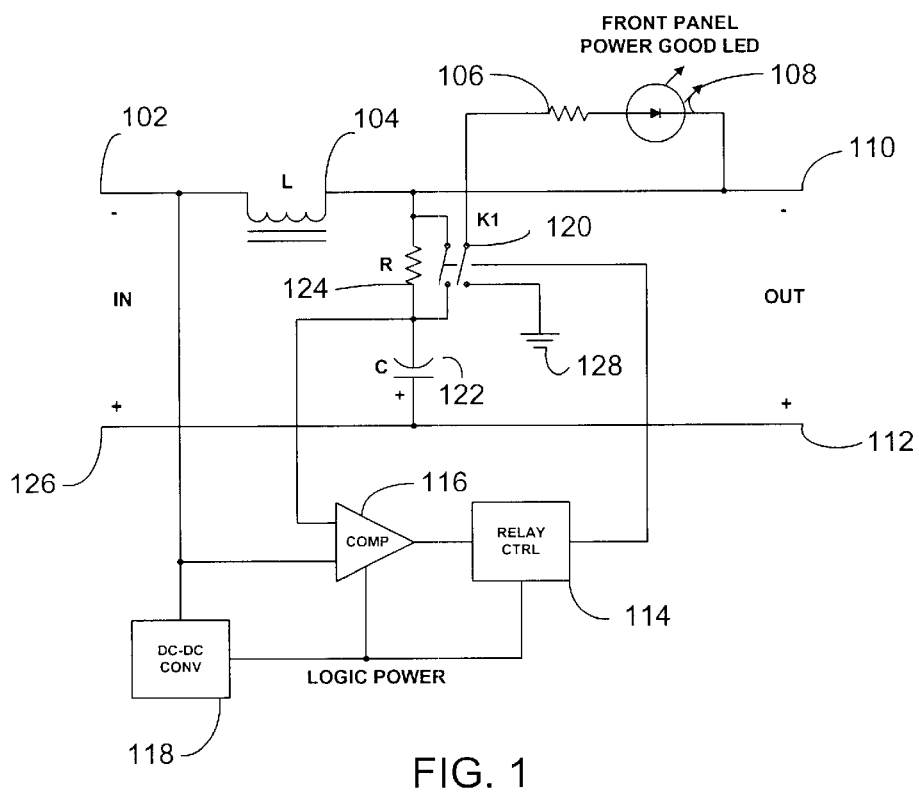
FIG. 1 is a block diagram of one embodiment where a comparison of power supply voltage to filtering capacitor voltage are compared to determine when to short circuit a relay in parallel with a charging resistor.

FIG. 1 shows a block diagram of one embodiment where in-rush current is automatically limited. This exemplary power supply has a DC-DC converter 118 that outputs a power supply voltage across input voltage nodes 102, 126. As shown in each of the embodiments of FIGS. 1–3, the power supply may be configured to provide negative voltage to a load such that input node 102 is negative relative to an input node 126 and output node 110 is negative relative to an output node 112. Alternatively, the power supply of these embodiments may be configured to provide positive voltage to the load.

To provide second order filtering in this embodiment, an inductor 104 is placed in series with the parallel combination of the load connected across output nodes 110, 112 and a capacitor 122. Alternatively, the inductor 104 may be omitted to provide first order filtering. To prevent in-rush current necessary for charging the capacitor 122, a resistor 124 is placed permanently in series with the capacitor 122 so that the current to the capacitor 122 is limited upon applying power from the DC-DC converter 118.

To allow the capacitor 122 to provide unrestricted filtering during operation, a first set of contacts of a relay 120 are connected in parallel with the resistor 124. While the capacitor is charging, the relay 120 is maintained in an open circuit state so that current is forced through the resistor 124. However, once the capacitor 122 is charged to a satisfactory level, the relay 120 is moved to a short circuit state so that current bypasses the resistor 124.

To properly control the operation of the relay 120, a comparator 116 and a relay control circuit 114 are included. The comparator 116 receives voltage from the output of the DC-DC converter 118, and may receive logic power from the DC-DC converter 118 or other DC source. The comparator 116 also receives the voltage across the capacitor 122. The comparator 116 compares the power supply voltage output from the DC-DC converter 118 to the voltage across the capacitor 116, and outputs a signal representative of the difference between the two. When the two voltages are approximately equal, the comparator's output changes to approximately zero.

The relay control circuit 114 receives logic power and the output from the comparator 116. When the comparator output indicates a difference between the two voltages being compared, the relay control circuit 114 holds the relay 120 in the open circuit state. When the comparator output is approximately zero, the relay control circuit 114 changes states of the relay 120 to create a short circuit around the resistor 124. The contact rating of the relay 120 is preferred to be the same as the maximum ripple current rating for the capacitor 122.

A visual indication may be provided to the operator of the power supply to indicate when charging of the capacitor 122 has completed. The visual indication includes a light emitting diode (LED) 108 in series with a biasing resistor 106 and a second set of contacts of the relay 120. These components are connected between the output node 110 and ground 128. When the relay 120 is in the open circuit state to force current through the resistor 124, current does not pass through and illuminate the LED 108. When the relay 120 switches to the short circuit state to by-pass the resistor 124, current flows through the LED 108 to illuminate it.

Figure 2:
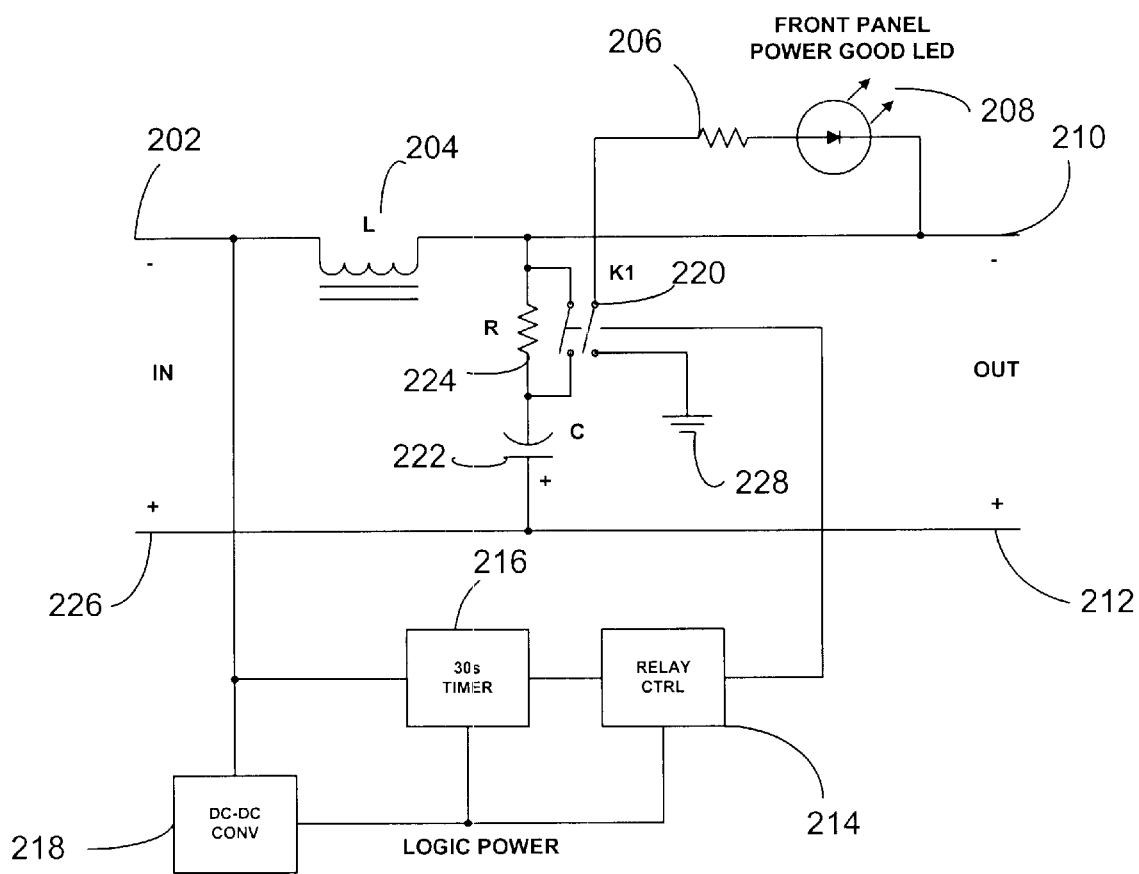
FIG. 2 is a block diagram of one embodiment where a timer determines when to short circuit a relay in parallel with a charging resistor.

FIG. 2 shows a block diagram of an alternative embodiment where in-rush current is automatically limited. This embodiment employs timing of the charging rather than monitoring of the charge voltage. This exemplary power supply has a DC-DC converter 218 that outputs a power supply voltage across input voltage nodes 202, 226.

To provide second order filtering in this embodiment, an inductor 204 is placed in series with the parallel combination of the load connected across output nodes 210, 212 and a capacitor 222. Alternatively, the inductor 204 may be omitted to provide first order filtering. To prevent in-rush current necessary for charging the capacitor 222, a resistor 224 may be placed permanently in series with the capacitor 222 so that the current to the capacitor 222 is limited upon applying power from the DC-DC converter 218.

To allow the capacitor 222 to provide unrestricted filtering during operation, a first set of contacts of a relay 220 are connected in parallel with the resistor 224. While the capacitor 222 is charging, the relay 220 is maintained in an open circuit state so that current is forced through the resistor 224. However, once the capacitor 222 has been charging for a satisfactory amount of time, the relay 220 is moved to a short circuit state so that current by-passes the resistor 224.

To properly control the operation of the relay 220, a timer 216 and a relay control circuit 214 are included. The timer 216 may receive voltage from the output of the DC-DC converter 218 to start the timer 216, and may receive logic power from the DC-DC converter 218 or other DC source. If the DC-DC converter 218 energizes the logic power output simultaneously with energizing the normal power supply output, then the timer 216 may be started by the application of logic power so that connection to the normal power supply output is not necessary. The timer 216 outputs a first value prior to the set amount of time elapsing, and then changes to a second value thereafter.

The relay control circuit 214 receives the logic power and receives the output from the timer 216. When the timer output indicates that the set amount of time has not yet expired, the relay control circuit 214 holds the relay 220 in the open circuit state. When the timer output changes to indicate that the set amount of time has elapsed, the relay control circuit 214 changes states of the relay 220 to create a short circuit around the resistor 224. As with the embodiment of FIG. 1, the contact rating of the relay 220 is preferred to be the same as the maximum ripple current rating for the capacitor 222.

This embodiment may also provide a visual indication to the operator of the power supply to indicate when charging of the capacitor 122 has completed. The visual indication includes a light emitting diode (LED) 208 in series with a biasing resistor 206 and a second set of contacts of the relay 220. These components are connected between the output node 210 and ground 228. When the relay 220 is in the open circuit state to force current through the resistor 224, current does not pass through and illuminate the LED 208. When the relay 220 switches to the short circuit state to by-pass the resistor 224, current flows through the LED 208 to illuminate it.

Exemplary values for the components of the embodiments of FIG. 1 and FIG. 2 are given. One skilled in the art will recognize that the values are only examples and that many other values may be used depending upon the particular application. A typical value for the resistor 124, 224 is 1000 ohms. A typical value for the capacitor 122, 222 is 12,000 micro-farads. This creates a time constant of 12 seconds, so using a 30 second timer 216 allows the capacitor 222 to charge to 95% of the power supply voltage. Longer intervals for the timer 216 are equally suitable.

Due to the resistor 124, 224, for a 52.2 Volt power supply, the maximum in-rush current is limited to 0.0522 Amps. This in-rush current is sufficiently low relative to a typical operating current of the power supply so that over-current protection is not tripped by the in-rush current. If no resistor 124, 224 is in place to limit the in-rush current for a 52.2 Volt power supply and a 12,000 micro-farad capacitor, in-rush current would reach a maximum of 626 Amps assuming a 1 millisecond reaction time for the over-current protection. The power through the resistor 124, 224 is 2.73 Watts with a 52.2 Volt power supply, so a 5 Watt resistor 124, 224 is suitable in this example.

Figure 3:
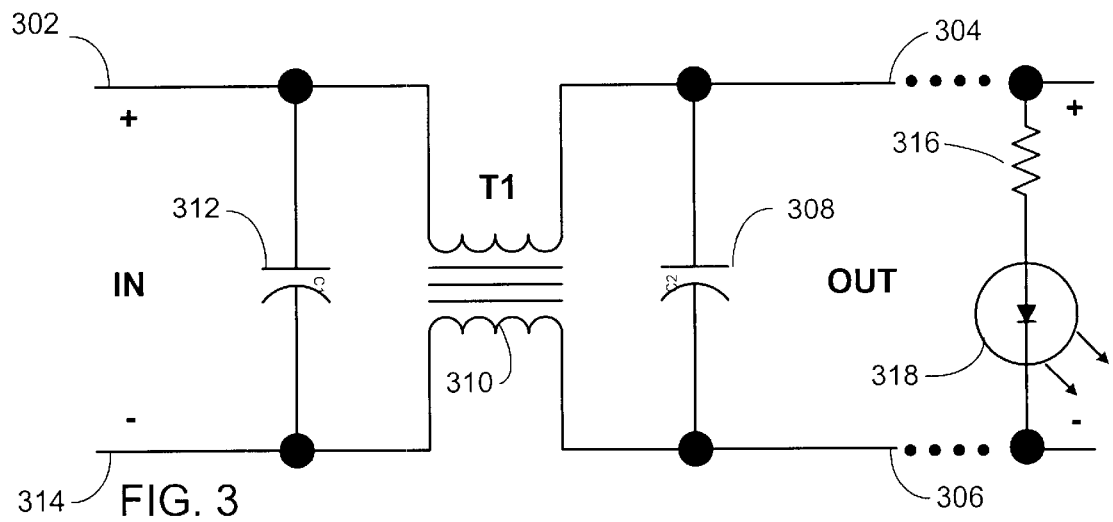
FIG. 3 is a block diagram of one embodiment where a common mode choke in disposed between a filtering capacitor across input nodes and a filtering capacitor across output nodes to permit relatively small capacitance to be used.

FIG. 3 shows another alternative embodiment of a power supply filter that limits in-rush current. A first capacitor 312 is connected across power supply input nodes 302, 314 where the power supply voltage from a DC-DC converter (not shown) is applied. A second capacitor 308 is connected across power supply output nodes 304, 306 that the load is also connected across.

A common mode choke 310 is connected within the filter so that current flows through one winding of the common mode choke 310 in a first direction when flowing between the input node 302 and the output node 304. Likewise, the common mode choke 310 is also connected within the filter so that current flows through a second winding of the common mode choke 310 in a second direction, opposite the first direction, as current flows between the output node 306 and input node 314.

The opposing currents within the common mode choke result in additional filtering so that the capacitors 312 and 308 may have a much smaller capacitance that results in a very small in-rush current. For example, two 1 micro-farad capacitors 312, 308 may be used in place of the 12,000 micro-farad capacitor 122, 222 of the previous embodiments. Because there is only a very minimal delay before the capacitors 308, 312 are charged, a visual indication is not as useful as for the previous embodiments.

However, this embodiment may also provide a visual indication to the operator of the power supply to indicate when power in on. The visual indication includes a light emitting diode (LED) 318 in series with a biasing resistor 316 that is connected across the positive and negative leads. This visual indication circuit can be located anywhere in the filter assembly of FIG. 3.

Figure 4:
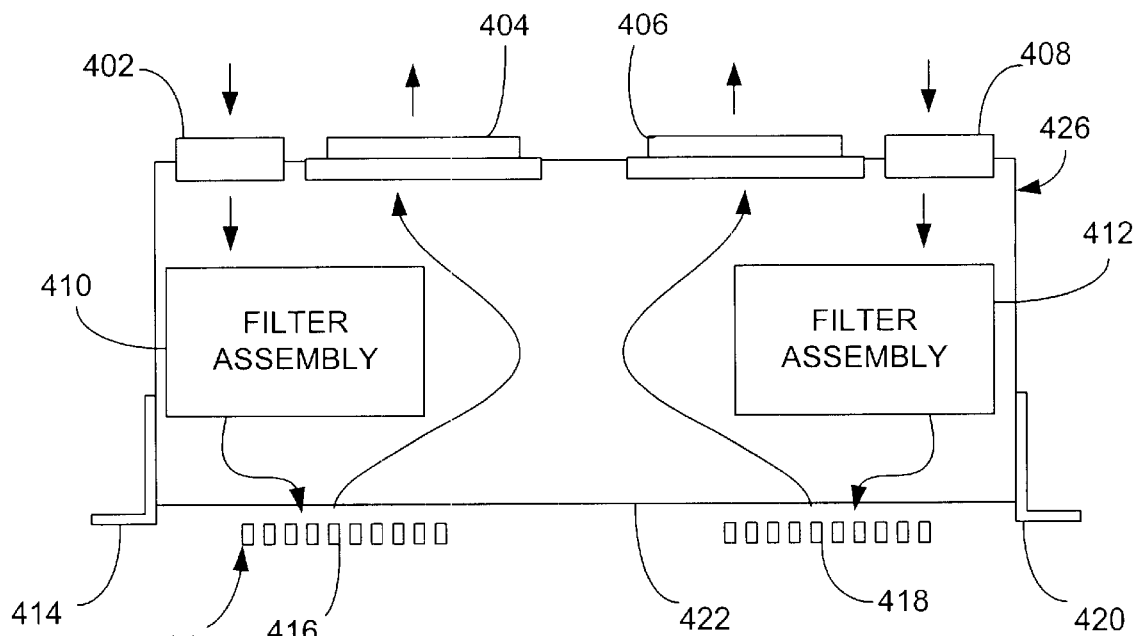
FIG. 4 is a top view of a power distribution panel employing one or more of the embodiments of FIGS. 1–3.
Figure 5:
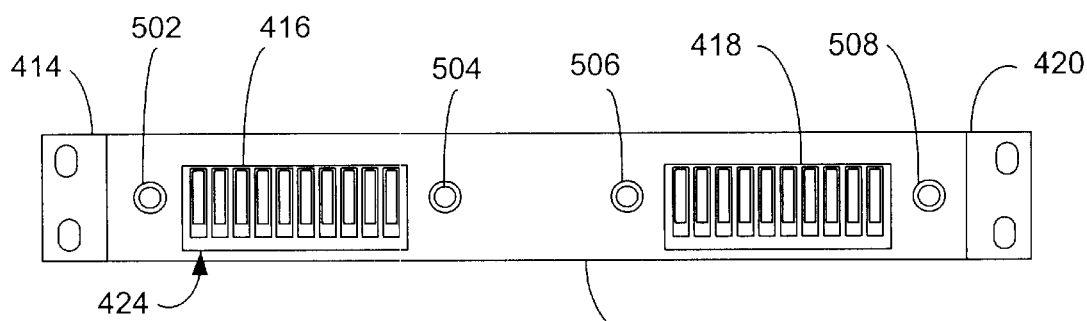
FIG. 5 is a front view of the power distribution panel of FIG. 4.

The various filter assembly embodiments of FIGS. 1–3 for limiting the in-rush current may be included in a power distribution panel. FIGS. 4 and 5 show an exemplary power distribution panel 422 contained in a housing 426 that may be mounted within a frame, rack, cabinet, chassis, or other structure (not shown). This example of a power distribution panel 422 has two power supply filters 410, 412 that power two different output loads. The power distribution panel 422 receives an input voltage through input connectors 402, 408. The input voltage is supplied across the input nodes of each filter assembly 410, 412.

The filter assemblies 410, 412 output the filtered voltage to over-current protection devices 424, such as fuse blocks 416, 418 or circuit breakers (not shown). Fuse blocks 416, 418 contain one or more fuses that provide over-current protection to the individual downstream devices (not shown) being powered through the filter assemblies 410, 412. The filtered voltage is supplied through the fuse blocks 416, 418 to output voltage connectors 404, 406 that supply the voltage to the downstream devices.

The power distribution panel 422 includes mounting brackets 414, 420 that secure the power distribution panel 422 within the chassis. The power distribution panel 422 also includes a faceplate 510 that supports the fuse blocks 416, 418 as well as LEDs. Two LEDs 502, 508 are connected to the respective fuse panels 416, 418 such that a blown fuse triggers the LED 502, 508 to indicate to the operator that a fuse has blown. Two LEDs 504, 506 are connected to the filter assemblies 410, 412 to illuminate when the filtering capacitors have sufficiently charged, as was discussed above.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A power supply filter with in rush current control, comprising:
    first and second power supply nodes, wherein a power supply voltage is applied across the first and second power supply nodes;
    a resistor and a capacitor in series between the first and second node;
    a relay with a first set of contacts in parallel with the resistor, the relay having a first position to create an open circuit in parallel with the resistor and a second position to create a short circuit in parallel with the resistor; and
    a control circuit operably coupled to the relay, wherein the control circuit includes a comparator and wherein the control circuit detects when to move the relay from the first position to the second position by the comparator comparing a voltage across the capacitor to the power supply voltage as current passes through the resistor to charge the capacitor.

2. The power supply filter of claim 1, wherein the control circuit includes a relay control circuit with an input that is coupled to an output of the comparator and an output that is coupled to the relay, and wherein the comparator output signals the relay control circuit to move the relay to the second position when the voltage across the capacitor is approximately equal to the power supply voltage.

3. A power supply filter with in rush current control, comprising:
    first and second power supply nodes, wherein a power supply voltage is applied across the first and second power supply nodes;
    a resistor and a capacitor in series between the first and second node;
    a relay with a first set of contacts in parallel with the resistor, the relay having a first position to create an open circuit in parallel with the resistor thereby enabling a charging of the capacitor from an uncharged state through the resistor and a second position to create a short circuit in parallel with the resistor; and
    a control circuit operably coupled to the relay, wherein the control circuit includes a timer and wherein the control circuit detects when to move the relay from the first position to the second position by the timer starting when the capacitor begins charging from an uncharged state and detecting the expiration of a specific amount of time.

4. The power supply filter of claim 3, wherein the control circuit includes a relay control circuit with an input that is coupled to an output of the timer and an output that is coupled to the relay, and wherein the timer output signals the relay control circuit to move the relay to the second position when the amount of time has expired.

5. The power supply filter of claim 3, further comprising an inductor disposed between the first node and a power supply providing the power supply voltage.

6. The power supply filter of claim 3, wherein the relay has a second set of contacts, the second set connected in series with a light emitting diode between the first node and a ground such that when the relay is in the first position the second set of contacts creates an open circuit to prevent the light emitting diode from illuminating and when the relay is in the second position the second set of contacts creates a short circuit to illuminate the light emitting diode.

7. The power supply filter of claim 3, wherein the first node has a negative potential relative to the second node.

8. A method of filtering a power supply and controlling in rush current, comprising:
    applying a power supply voltage across first and second power supply nodes to pass current through a resistor and to a capacitor, wherein the resistor and capacitor are in series between the first and second nodes;
    maintaining a relay with a first set of contacts in parallel with the resistor in a first position to create an open circuit in parallel with the resistor; and applying the power supply voltage and a voltage across the capacitor to a comparator as current passes through the resistor to charge the capacitor to determine when the relay should be moved to a second position to create a short circuit in parallel with the resistor.

9. The method of claim 8, further comprising:

outputting from the comparator a signal to a relay control circuit coupled to the relay; and controlling the relay from the relay control circuit such that the relay remains in the first position until the output of the comparator indicates that the voltage across the capacitor is approximately equal to the power supply voltage.

10. A method of filtering a power supply and controlling in rush current, comprising:

applying a power supply voltage across first and second power supply nodes to pass current through a resistor and to a capacitor, wherein the resistor and capacitor are in series between the first and second nodes;

maintaining a relay with a first set of contacts in parallel with the resistor in a first position to create an open circuit in parallel with the resistor thereby enabling a charging of the capacitor from an uncharged state through the resistor; and starting a timer when power supply voltage is first applied across the first and second power supply nodes to begin charging of the capacitor from the uncharged state and determining from the timer when a specific amount of time has expired that indicates when the relay should be moved to the, second position to create a short circuit in parallel with the resistor.

11. The method of claim 10, further comprising:

outputting from the timer a signal to a relay control circuit coupled to the relay; and controlling the relay from the relay control circuit such that the relay remains in the first position until the output of the timer indicates that the specific amount of time has elapsed.

12. The method of claim 10, further comprising passing current through an inductor between a power supply providing the power supply voltage and the first node.

13. The method of claim 10, wherein the relay has a second set of contacts, the second set connected in series with a light emitting diode between the first node and a ground, the method further comprising:

when maintaining the relay in a first position to create an open circuit in parallel with the resistor, maintaining the second set of contacts create an open circuit to prevent the light emitting diode from illuminating; and when the relay is in the second position, causing the second set of contacts create a short circuit to illuminate the light emitting diode.

14. The method of claim 10, wherein applying the power supply voltage across the first and second power supply nodes comprises applying a negative potential to the first node relative to the second node.

15. A power distribution panel, comprising:

an input voltage connector;

a filtering circuit having current in-rush control and a filtering capacitor, the filtering circuit being operable to receive voltage through the input voltage connector and the current in-rush control being operable to limit current drawn through the input voltage connector until the filtering capacitor is at least partially charged;

an output voltage connector; and an over-current protection device electrically connected between an output of the filtering circuit and the output voltage connector.

16. The power distribution panel of claim 15, wherein the in-rush control comprises a charging resistor in series with the filtering capacitor, relay in parallel with the resistor, and a relay control operable to position the relay to create an open circuit upon the filtering circuit receiving voltage and position the relay to create a short circuit once the filtering capacitor is at least partially charged.

17. The power distribution panel of claim 16, wherein the relay control position the relay based upon a comparison of the voltage received through the input connector with the voltage across the filtering capacitor.

18. The power distribution panel of claim 16, wherein the relay control position the relay based upon expiration of a set amount of time from when the filter circuit receives the voltage.

19. The power distribution panel of claim 15, further comprising a faceplate, and wherein the filtering circuit includes a light emitting diode operable to illuminate when the filtering capacitor is at least partially charged, the light emitting diode being disposed on the faceplate.

20. The power distribution panel of claim 15, wherein the over-current protection device includes one or more fuses.

21. The power supply filter of claim 1, wherein the relay has a second set of contacts, the second set connected in series with a light emitting diode between the first node and a ground such that when the relay is in the first position the second set of contacts creates an open circuit to prevent the light emitting diode from illuminating and when the relay is in the second position the second set of contacts creates a short circuit to illuminate the light emitting diode.

22. The power supply filter of claim 1, wherein the first node has a negative potential relative to the second node.

23. The method of claim 8, wherein the relay has a second set of contacts, the second set connected in series with a light emitting diode between the first node and a ground, the method further comprising:

when maintaining the relay in a first position to create an open circuit in parallel with the resistor, maintaining the second set of contacts create an open circuit to prevent the light emitting diode from illuminating; and when the relay is in the second position, causing the second set of contacts create a short circuit to illuminate the light emitting diode.

24. The method of claim 8, wherein applying the power supply voltage across the first and second power supply nodes comprises applying a negative potential to the first node relative to the second node.

25. The power supply filter of claim 1, further comprising an inductor disposed between the first node and a power supply providing the power supply voltage.

26. The method of claim 8, further comprising passing current through an inductor between a power supply providing the power supply voltage and the first node.

* * * * *

UNITED STATES PATENT AND TRADEMARK OFFICE
CERTIFICATE OF CORRECTION

PATENT NO. : 6,614,668 B2
DATED : September 2, 2003
INVENTOR(S) : Coffey et al.

It is certified that error appears in the above-identified patent and that said Letters Patent is hereby corrected as shown below:

Column 8,
Lines 16 and 20, "position" should read -- positions --

Signed and Sealed this

Thirtieth Day of December, 2003

JAMES E. ROGAN
*Director of the United States Patent and Trademark Office*